April 28, 1970     R. STRONG ET AL     3,508,787

CONVERTIBLE ENCLOSURE FOR PICKUP TRUCK BEDS

Filed Oct. 1, 1968     3 Sheets-Sheet 1

INVENTORS
Ricks Strong
Paul B. Strong

BY *Cecil L. Wood*

ATTORNEY

April 28, 1970 R. STRONG ET AL 3,508,787
CONVERTIBLE ENCLOSURE FOR PICKUP TRUCK BEDS
Filed Oct. 1, 1968 3 Sheets-Sheet 2

INVENTORS
Ricks Strong
Paul B. Strong

BY

ATTORNEY

United States Patent Office 3,508,787
Patented Apr. 28, 1970

3,508,787
CONVERTIBLE ENCLOSURE FOR PICKUP
TRUCK BEDS
Ricks Strong, 11585 E. Ricks Circle 75230, and Paul B.
Strong, 6005 Preston Road 75205, both of Dallas, Tex.
Filed Oct. 1, 1968, Ser. No. 764,179
Int. Cl. B60p 7/02; B63b 7/02
U.S. Cl. 296—100
4 Claims

ABSTRACT OF THE DISCLOSURE

A closure for pickup truck beds capable of removal therefrom and convertible into a boat, the bow portion of which is adapted to be contained within the closure while the truck is in transit and removable therefrom, as desired, when the closure is used only as a cover for the truck bed in the normal use of the truck.

SUMMARY

This invention relates to a cover for the beds of pickup trucks, and it has particular reference to a cover which can be removed from the truck and converted to a boat.

A prime object of the invention resides in the provision of a rigid cover capable of being hingedly applied to the bed of a pickup truck to provide a closure therefor when transporting cargo and embodying features of design by which it can be readily removed from the truck and converted to a boat.

A further object of the invention is that of providing a durable but light constructed cover by which the contents of a truck bed can be protected against the elements while serving an additional function as a boat when inverted and assembled with a bow section which can be secured within the cover when it is applied to the truck.

Broadly, the invention comprises a cover or closure for truck beds which can be formed of light metal or plastic materials in sections which are easily assembled for flotation as a light boat.

DESCRIPTION OF THE DRAWINGS

While the foregoing objects are paramount, other and lesser objects will become apparent as the description proceeds when considered with the appended drawings wherein.

DETAILED DESCRIPTION

Figure 1:
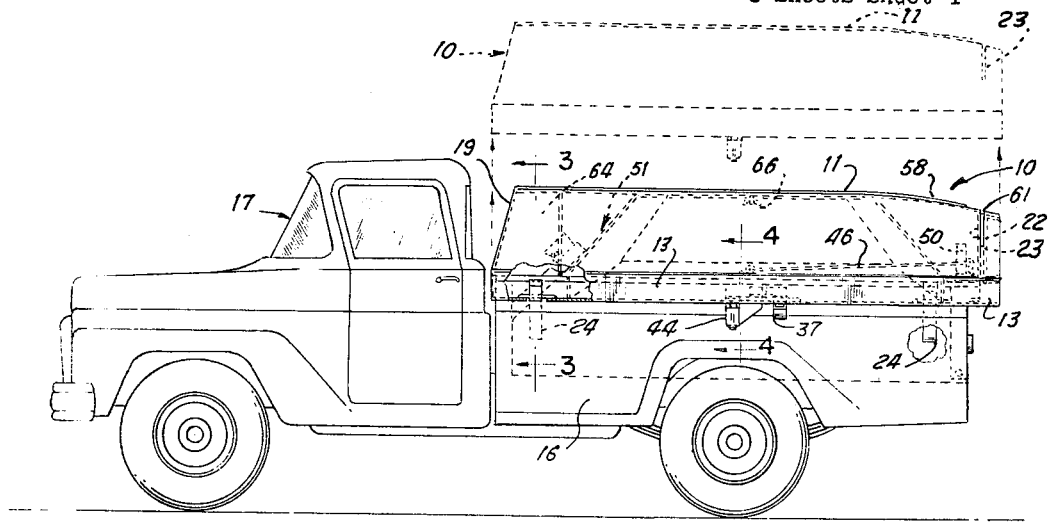
FIGURE 1 is a side elevational view of a pickup truck showing the invention applied thereto, and illustrating, in broken lines, how the device is removed from the truck.
Figure 2:
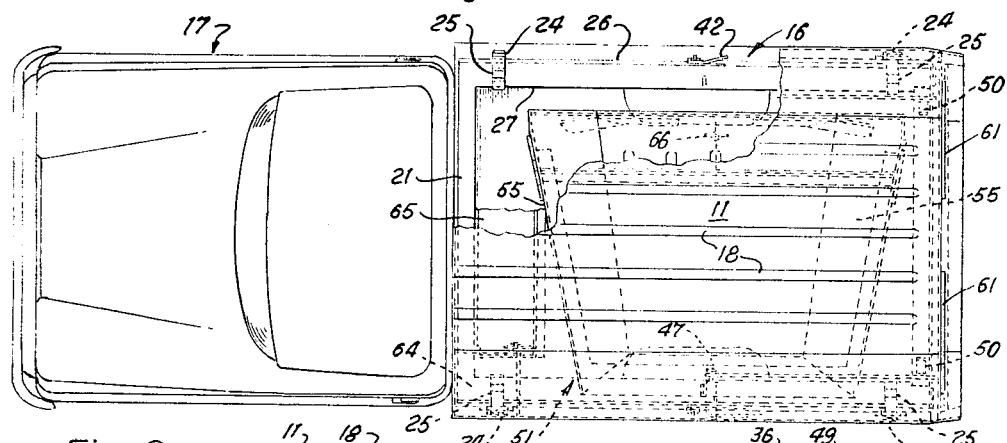
FIGURE 2 is a plan view of the truck and showing the invention attached, a portion of which is broken away to show a section enclosed therein by which to form a boat structure, the broken lines indicating the truck body and securing means for the invention thereto.
Figure 3:
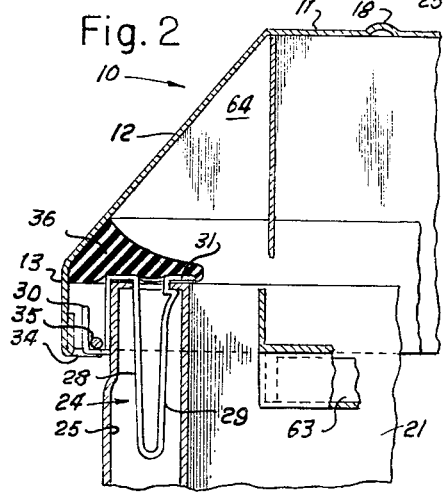
FIGURE 3 is an enlarged fragmentary sectional view, on line 3—3 of FIGURE 1, of one side wall of the truck bed and of the invention, and one of the detachable supporting devices for the cover.
Figure 4:
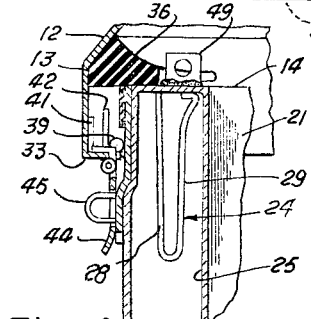
FIGURE 4 is an enlarged sectional view, on line 4—4 of FIGURE 1, through one side wall of the truck bed and showing one of the latch means for securing the invention in position on the bed.
Figure 5:
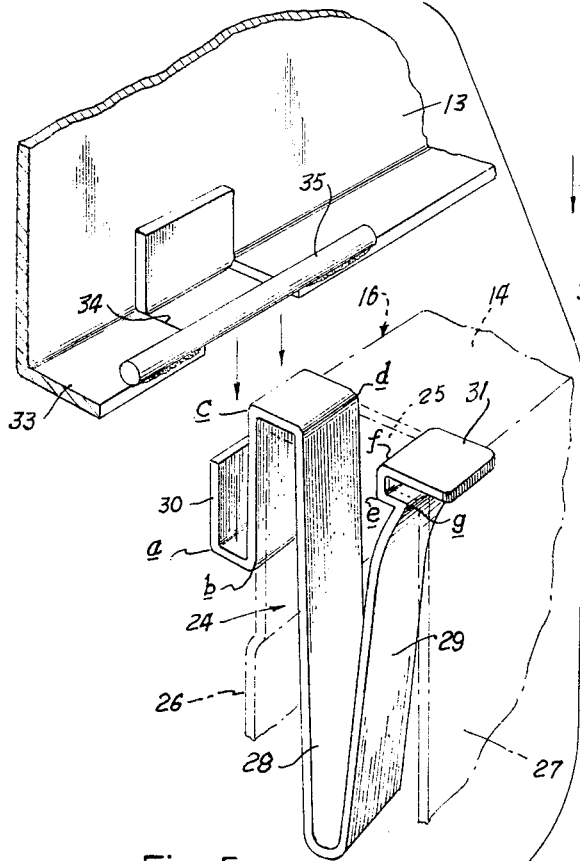
FIGURE 5 is an exploded view fragmentarily showing the cover as applied to the truck bed wall, indicated by broken lines, and a flexible supporting device for the cover.

The invention, in its preferred form, comprises a rectangular shell 10 formed with a panel portion 11 having parallel side walls 12 inclined downwardly and outwardly, terminating in depending side flanges 13 which overhang the upper rims 14 of the side walls 15 of the body 16 of a truck 17, when applied thereto in the manner illustrated in FIGURES 1, 2, 9 and 10, and shown in detail in FIGURES 3, 4 and 5. The panel portion 11 is formed with spaced longitudinal ribs 18 for rigidity. The front wall 19 of the shell 10 is slightly inclined outwardly and downwardly and has a depending portion 20 which overhangs the front wall 21 of the truck body 16, as best shown in FIGURE 1.

Figure 8:
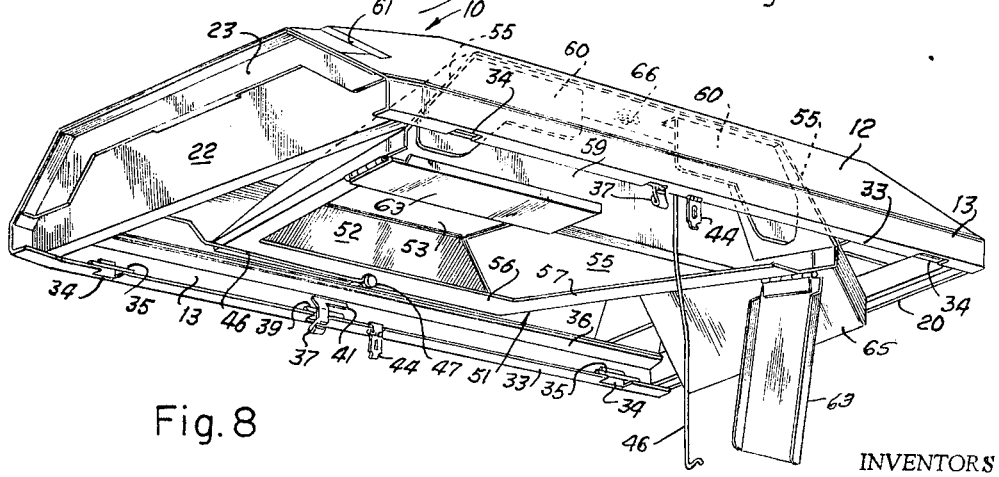
FIGURE 8 is a perspective view of the invention, as applied to the truck bed, showing the bow section enclosed therein and attachable to the cover to form a boat, and showing the hinged seats for the boat.
Figure 9:
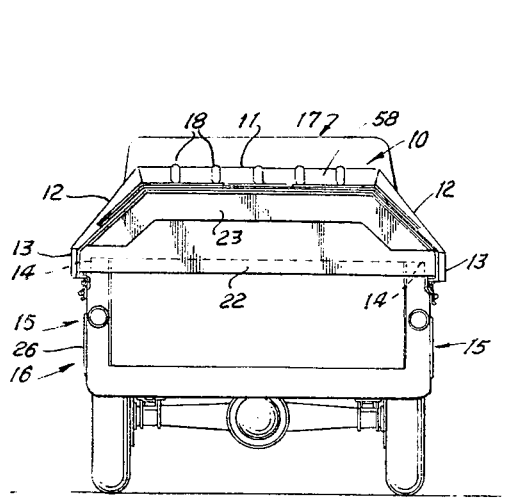
FIGURE 9 is a rear end view of a pickup truck to which the invention is applied.

The shell 10 has a planar rear wall 22 perpendicular to the panel 11 and spaced inwardly from the rearmost end of the shell 10, as shown in FIGURE 8. Spaced outwardly from and parallel to the exterior surface of the wall 22 is a flange 23 which depends from the panel 11 and the side walls 12 and having its parallel margins conforming to the angular contour thereof. The purpose of the flange 23 will presently become apparent.

The shell 10, in its function as a cover or top for the truck body 16, and as illustrated in FIGURES 1, 2, 8, 9 and 10, is supported on the side walls 15 on the body 16 by flexible clip elements 24 removably arranged in the stake wells 25 in the walls 15 which are hollow, comprising inner and outer members 26 and 27, as shown in FIGURES 3, 4 and 5, and are generally common to the type of truck shown.

The members 24 are formed of resilient steel strips shaped longitudinally in the manner shown in FIGURES 3, 4 and 5, being bent intermediate their ends to a substantial V-shape forming a pair of divergent legs 28 and 29. The leg 28 has a series of right-angular breaks a, b, c and d near its outer end to form box-like portions providing a supporting bracket 30 for the shell 10 and a suspension media 31 which embraces the upper edge of the outer member 26 of the hollow wall 15 of the truck body 16. The outer end of the opposite leg 29 has right-angular breaks e, f and g forming a latch 32 for engaging the inner member 27 of the hollow wall 15 of the body 16, as best shown in FIGURE 5, whereby to prevent voluntary displacement of the elements 24.

Figure 6:
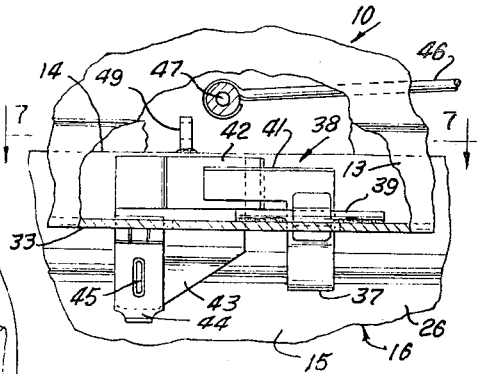
FIGURE 6 is a fragmentary illustration of one side of the cover and the truck bed, a portion of the former being broken away, showing one of the supporting devices and one of the latches for the cover.

Each of the flanges 13 forming the lower edges of the walls 12 of the shell 10 is bent inwardly to form a right-angular flange 33, near each end of which is a cutout or gap 34 across which is welded, or otherwise secured, a rod 35 arranged longitudinally of the flanges 33 which is received in the bracket 30 of each member 24, as shown in FIGURES 3, 5 and 6. A sealing element 36 of a yieldable material is arranged along the internal surface of each of the side and end walls 12, 21 and 22, near the upper margins thereof, which is adapted to engage the upper edges 14 of the walls 15 of the truck body 16, as shown in FIGURES 3 and 4.

Figure 7:
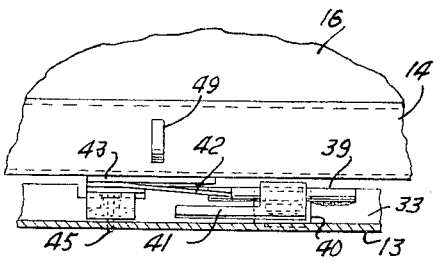
FIGURE 7 is a fragmentary illustration, partially in section on line 7—7 of FIGURE 6, showing the supporting device and latch for the cover.
Figure 10:
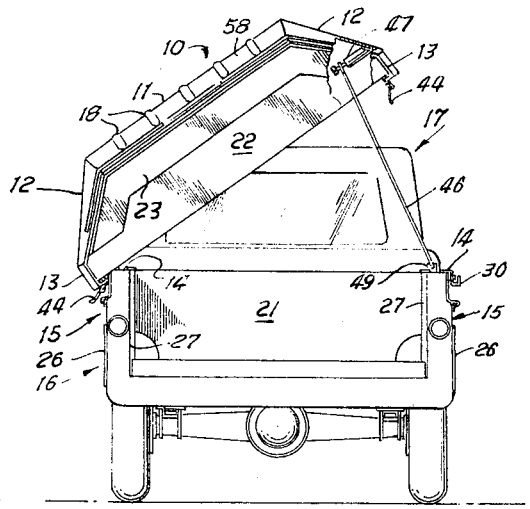
FIGURE 10 is another rear view of a truck showing the invention hinged upwardly on one side and supported by a disposable prop.

The shell 10 is adapted to be hinged on either side of the truck body 16 through the medium of the brackets 30 and the rods 35 in the manner illustrated in FIGURE 10, and is readily removed as shown in broken lines in FIGURE 1. In FIGURES 4, 6 and 7 is shown a latching device by which the shell 10 is secured in position on each side of the vehicle, and locked if desired, the arrangement being presently described in detail.

Referring to FIGURES 1, 4, 6, 7 and 8, and particularly to FIGURES 6 and 7, the latch assembly comprises a handle element 37 which is formed with one leg of an L-shaped plate 38 fulcrumed on a rod 39 welded, or otherwise secured, across a cut-out or gap 40 intermediate the ends of the internal flange 33 of the shell 10, as shown in FIGURES 6 and 7, the opposite leg 41 extending horizontally at right angles.

A resilient member 42 is secured to a plate 43 attached to each side wall 15 of the truck body 16 and normally extends outwardly over each flange 33 of the shell 10 to secure the latter until the legs 41, which repose behind the members 42 in their normal positions, are moved inwardly thereagainst by the handle elements 37 to clear the inner edges of the flanges 33 to permit the shell 10 to be hinged upwardly from either side, as indicated in FIGURE 10, or removed from the vehicle, as shown in broken lines in FIGURE 1 or in the perspective illustration in FIGURE 8. A hasp 44 is hinged to each flange 33 which mates with a staple 45 on each of the plates 43 by which the shell 10 can be locked to the body 16 on each side thereof, as shown in FIGURES 1, 4, 9 and 10.

To gain access to the truck body 16 the shell 10 can be raised from either side of the vehicle, as indicated in FIGURE 10, and supported in its elevated position by prop rods 46 which have their upper ends pivotally attached to studs 47 interiorly of the shell 10, as best shown in FIGURES 6, 8, 10 and 11, their outer or free ends forming hooks 48 which can be secured to lugs 49 welded to the upper rim 14 of the side walls 15 of the truck body 16, as shown in FIGURE 10. While the shell 10 is seated, in the manner shown in FIGURE 9, the prop rods 46 are folded into the shell 10 and secured by clips 50 attached to the side walls 12.

CONVERSION TO BOAT

Heretofore the description of the invention has been directed to its application as a cover or closure for a truck body with only brief reference to its use as a boat. Obviously, however, the shell 10, when inverted, is capable of flotation on water, the flanges 13 along each side wall 12 now functioning as gunwales. The modification of the shell 10 to a boat, as shown in FIGURES 11 and 12, is accomplished by the attachment of a bow section 51 which is removably secured within the shell 10 while in use as a cover or closure for a truck body, as illustrated in broken lines in FIGURES 1 and 2, and in solid lines in FIGURE 8.

The bow section 51 has a planar front wall 52 which recedes downwardly and rearwardly to the bottom 53 which is formed with ribs 54 for rigidity similar to the member 11 of the shell 10. The side walls 55 of the bow section 51 diverge rearwardly from the front wall 52 and are inclined downwardly and inwardly to the bottom 53 at approximately the same degree in which the walls 12 of the shell 10 are inclined so that when the bow section 51 is joined to the shell 10 there exists a continuity of form.

Formed about the upper rims of the walls 52 and 55 are inwardly directed flanges 56 and 57, respectively, the former corresponding in width to the flanges 33 of the shell 10. The bottom 53 is slightly inclined rearwardly from the front wall 52 and in the same plane as that of the inclined portion 58 of the normal top 11 of the shell 10, indicated in FIGURES 1, 9, 10 and 12.

Figure 11:
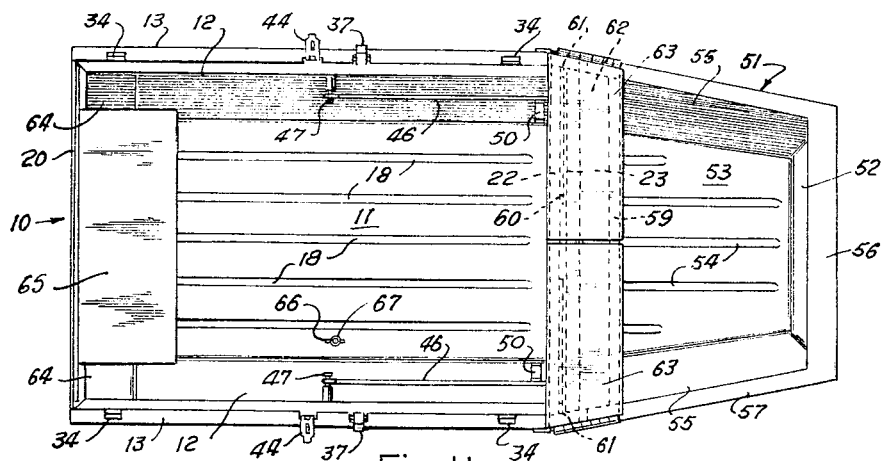
FIGURE 11 is a plan view of the invention as assembled in a boat structure.
Figure 12:
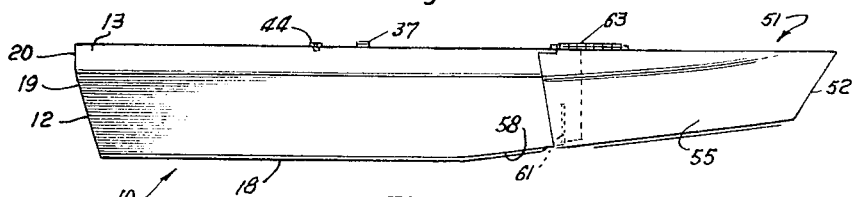
FIGURE 12 is a side elevational view of the assembled boat.

Opposite the front wall 52 is a rear wall 59 having a depth dimension equal to that of the side walls 55 at this point, the latter extending rearwardly beyond the wall 59, as shown in FIGURES 8 and 11.

Spaced rearwardly from the rear wall 59 of the bow section 51 is a pair of angular plates 60 in spaced planar alignment and receivable in aligned slots 61 arranged transversely of the shell 10 adjacent to the outer surface of the rear wall 22 thereof and between the latter and the flange 23, as shown in FIGURES 1 and 8, whereby to join the member 51 to the shell 10 in the manner shown in FIGURES 11 and 12. The plates 60 are thus contained in the narrow space between the wall 22 and the flange 23 providing a rigid connection between the shell 10 and the bow section 51.

Due to the spacing of the rear wall 59 from the plates 60, and the wall 22 of the shell 10, a compartment 62 is formed transversely of the assembled boat into which water can enter through the slots 61, the level of which would correspond to the normal draft of the boat. This compartment is desirable for containing live fish bait. A pair of closures 63 are provided for the compartment 62 which may also function as a seat. These members are hinged at one end to the respective sides of the member 51, as shown in FIGURES 8, 11 and 12.

Small compartments 64 may also be formed in each corner of the shell 10, forwardly thereof near the front wall 20, or the rear wall of the boat assembly, for any desired purpose, and these compartments provide supports for a removable seat 65, as shown in FIGURES 1, 2, 3 and 11.

The bow section 51 is generally trapezoidal in plan, as exemplified in broken lines in FIGURE 2, and in solid lines i in FIGURE 11, having its end walls 52 and 59 parallel while the side walls 55 are inclined outwardly from the front wall 52 to the rear wall 59, as best shown in FIGURE 11. The member 51 is secured within the shell 10 by a winged nut 66 threaded upon a stud 67 in the panel 11, as shown in FIGURES 1, 2 and 11.

We claim:

1. A closure for a truck body having means for detachably and hingedly securing it to said body, and means for converting said closure into a boat, including a mating element removably supported in said closure, in combination, a rectangular water-tight shell having a top panel, side and end walls, a flange spaced from and parallel to one end wall exteriorly thereof and a pair of longitudinally aligned slots in said top panel between said one end wall and said flange, the said mating element having a bottom, front and rear walls, and rearwardly diverging side walls, a pair of angular plates arranged in planar alignment transversely of said bottom exteriorly of and spaced from the parallel to said rear wall and receivable in the slots in said top panel whereby, when said shell is inverted, the said mating element can be detachably secured to said shell to form a boat structure.

2. A combination truck body closure and boat structure as described in claim 1, wherein the said slots in said top panel of said shell are adjacent to and exteriorly of said one end wall thereof and the plates on said mating element bear against said one end wall of said shell when said mating element is interlocked therewith.

3. A combination truck body closure and boat structure comprising, in combination with a body on a truck and means for securing said closure to said body, and a mating section for said closure supportable therein, a shell defined by a flat panel, end walls perpendicular to the planar surfaces of said panel, and side walls inclined outwardly therefrom, the said panel having a pair of longitudinally aligned slots transversely thereof exteriorly of one of said end walls for detachably securing said mating section thereto to form a boat structure, the said mating section having a bottom panel, parallel front and rear walls and rearwardly diverging side walls joinable with the side walls of said shell, and a pair of plates arranged in planar alignment perpendicular to and transversely of said bottom panel exteriorly of the rear wall of said mating section and spaced from the parallel thereto, the said plates being receivable in said slots for interlocking engagement with the said shell.

4. A combination truck body closure and boat structure as described in claim 3, wherein the side walls and bottom panel of said mating section extend beyond the rear wall thereof to overlap the panel and side walls of said shell when said mating section is joined therewith.

References Cited

UNITED STATES PATENTS

| | | |
|---|---|---|
| 1,455,994 | 5/1923 | Cowan. |
| 3,009,731 | 11/1961 | Fowler _____ 296—23 |
| 3,180,674 | 4/1965 | Pounds _____ 296—100 |
| 3,381,322 | 5/1968 | Cook. |

LEO FRIAGLIA, Primary Examiner

R. R. SONG, Assistant Examiner

U.S. Cl. X.R.

296—23; 9—2